INVENTORS
DONALD J. STOKER
LISSO STEWART MIMS
SIDNEY SIEGEL

ATTORNEY

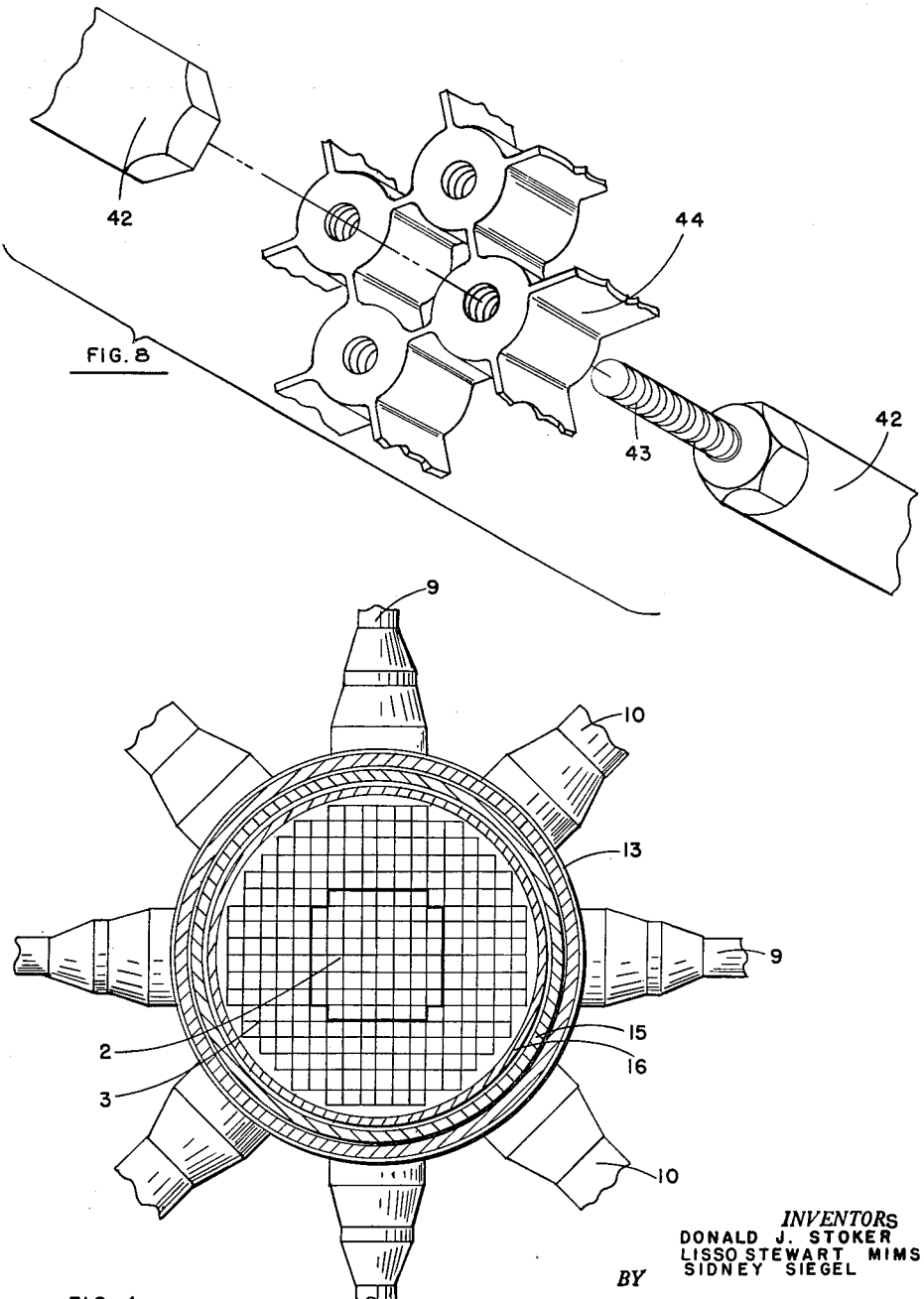

INVENTORS
DONALD J. STOKER
LISSO STEWART MIMS
SIDNEY SIEGEL
BY
ATTORNEY

Nov. 16, 1965 D. J. STOKER ETAL 3,218,237
FUEL ELEMENT FOR A STEAM SUPERHEAT BOILING
WATER NUCLEAR REACTOR
Original Filed July 3, 1959 7 Sheets-Sheet 5

INVENTORS
DONALD J. STOKER
LISSO STEWART MIMS
BY SIDNEY SIEGEL

Gerald A. Koris
ATTORNEY

Nov. 16, 1965 D. J. STOKER ETAL 3,218,237
FUEL ELEMENT FOR A STEAM SUPERHEAT BOILING
WATER NUCLEAR REACTOR
Original Filed July 3, 1959 7 Sheets-Sheet 7

*INVENTORS*
DONALD J. STOKER
LISSO STEWART MIMS
BY SIDNEY SIEGEL

*Gerald A. Koris*
ATTORNEY

United States Patent Office 3,218,237
Patented Nov. 16, 1965

3,218,237
FUEL ELEMENT FOR A STEAM SUPERHEAT
BOILING WATER NUCLEAR REACTOR
Donald J. Stoker, Woodland Hills, Lisso Stewart Mims,
Tarzana, and Sidney Siegel, Pacific Palisades, Calif.,
assignors to North American Aviation, Inc.
Original application July 3, 1959, Ser. No. 824,874.
Divided and this application July 30, 1962, Ser.
No. 216,010
1 Claim. (Cl. 176—71)

This is a division of application Serial No. 824,874, filed July 3, 1959, now U.S. Patent 3,150,052 issued September 22, 1964.

Our invention relates to a nuclear reactor with nuclear superheat, and more particularly to an improved boiling water reactor with nuclear superheat.

A great deal of experience has been accumulated with water cooled reactors, both of the pressurized and the boiling varieties. The water reactors have found favor because of the excellent moderating properties of hydrogen, the satisfactory cooling characteristics of water, and the existing large body of technology developed from the use of water in conventional power plants. Among the drawbacks of the water reactor systems, however, has been a practical limitation of the maximum temperatures of water or steam to below approximately 600° F. Thus, the steam conditions in water reactor power plants are considerably below that of standard practice in modern conventional power plants. The overall efficiencies of such plants have been correspondingly low, as compared with standard conventional practice, for example in the order of 25%. Superheat is a way of improving the quality of steam, and conventional oil and coal-fired superheaters, and nuclear superheat have been considered for use with nuclear reactors. In nuclear superheat, the superheater is an active region of the reactor core containing fuel elements, and a moderator is accordingly required therein. It therefore is relevant to examine superheater moderator requirements. Heretofore water has been considered as the moderator for the superheater region in water cooled reactors because of simplicity in dealing with a single fluid in the reactor, but a number of drawbacks are apparent. If water is used for the moderator, it must be insulated from the superheater to prevent heat loss to it from the superheated steam. Since considerable heat is in any event absorbed in the water, it must be circulated and cooled externally or mixed with saturated steam leaving the boiling region. If mixed with saturated steam leaving the boiling region, a heat balance must be reached, and if the heat is exhausted to a separate coolant stream, additional piping and pumping is required. Furthermore, rather complicated seals and flow paths must be provided for the water. Another drawback of water moderator is that the required thermal insulation between the water and steam serves to diminish the neutron economy of the system through neutron absorption. A solid thermal insulation material which is of low neutron cross section, radiation damage resistant, and impervious to steam and water has not yet been developed. If thin walls are used to separate the steam and liquid moderator, the sections must be kept at essentially the same pressure to avoid channel bursting or collapse. Finally, changes in moderator temperatures produce large changes in moderator densities and moderating power, leading to nuclear instabilities.

It is, accordingly, an object of our present invention to provide an improved nuclear reactor with nuclear superheat.

It is another object to provide an improved boiling water reactor with an integral nuclear superheater.

Another object is to provide an improved nuclear superheat or boiling water reactor with a two-region core.

Another object is to provide such a reactor wherein the need for insulation between the fuel elements and moderator in the superheater is eliminated and improved neutron economy is achieved.

Still another object is to provide such a reactor which does not require a pressure balancing system between steam and moderator.

Still another object is to provide such a reactor which eliminates complicated seals and flow paths.

Yet another object is to provide such a reactor wherein changes in moderator temperature do not have a large effect on moderating power or nuclear stability.

The above and further objects and advantages of our invention will become apparent from the following detailed description, taken together with the accompanying drawings and the appended claims. In the drawings:

FIG. 4 is a section along line 4—4 of the active core region of FIG.1, partly in plan;

FIG. 8 is a perspective of an interior structural portion of the fuel element shown in FIG. 7;

Figure 1:
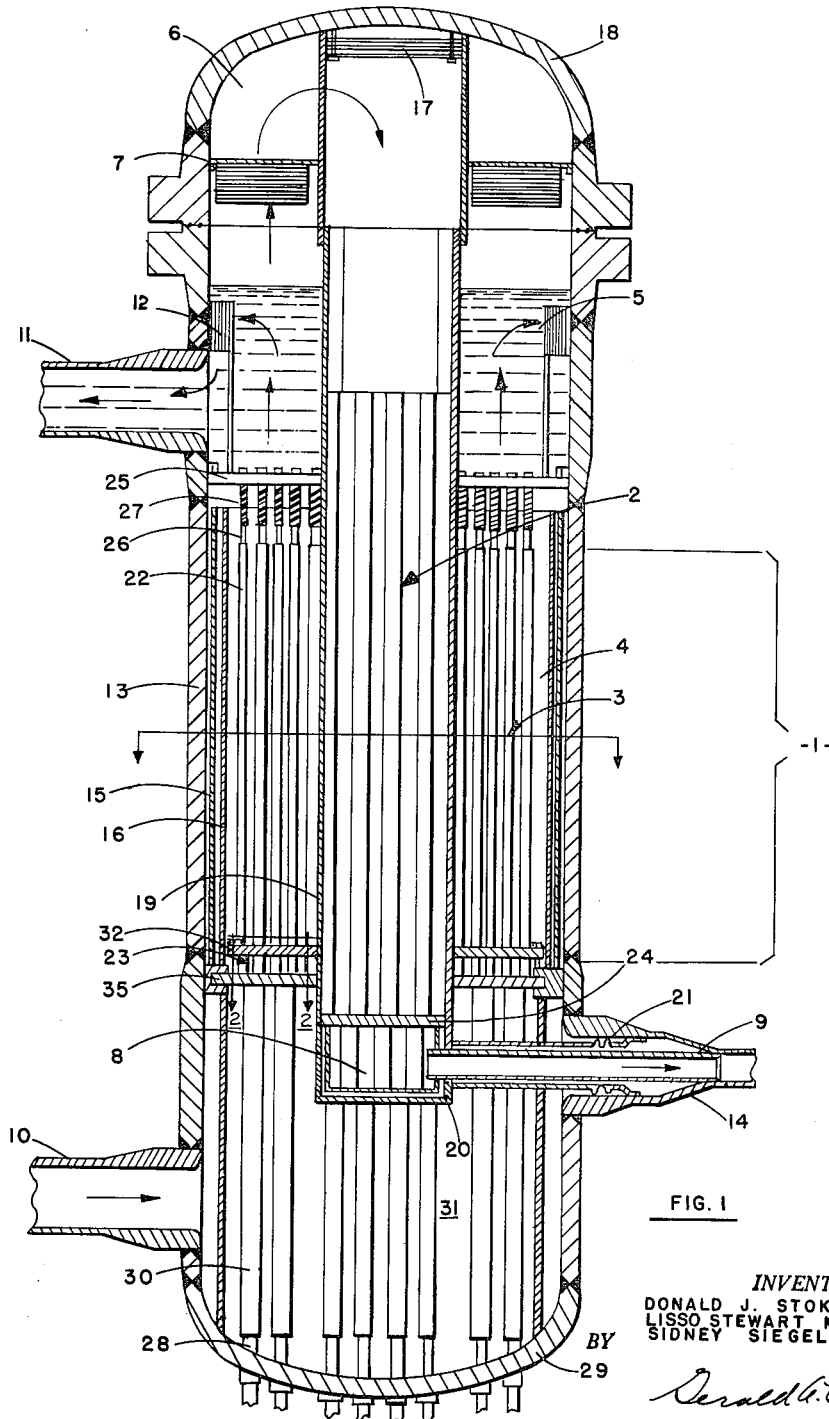
FIG. 1 is an overall elevation view, partly in section, of a representative embodiment of our invention.

Basically, our invention comprises a two-region direct or dual cycle boiling water reactor with an integral nuclear superheater utilizing a solid moderator in the steam superheat region. The utilization of a superheater with a solid moderator gives gross thermal efficiencies on the order of 40%; permits use of conventional design steam turbine; requires only slightly enriched uranium throughout the entire two-region core; reduces fuel and capital costs; and reduces the size of the pressure vessel compared to a conventional boiling water reactor of similar generating capacity. Improved nuclear stability is obtained because there is no large density change of moderator.

The reactor consists of two close coupled regions. The boiling region produces saturated steam bubbles in the water which rise to the top of the reactor vessel. The steam then reverses flow direction and enters the superheater, wherein it is superheated to the desired temperature. The superheater region may be disposed in either the center or edge of the core tank, or may be an annular region between two boiler regions.

The use of a solid moderator in the superheater region affords a number of striking advantages over water moderator. The solid moderator can be operated at steam or higher temperatures, thereby eliminating the need for insulation between the steam and the moderator, and the need for moderator cooling. This simplifies the core design and decreases heat losses. Elimination of the insulation between steam and moderator further serves to improve neutron economy by removing neutron absorbing material. Changes in moderator temperature do not have a large effect on the moderating power as in the case of water moderator. Furthermore, no pressure balance system is required between the steam and the moderator. The advantages of our two-region boiling water reactor with a solid moderated, integral nuclear superheat region are thus many and varied, and the reactor represents a distinct advance in boiling water reactor technology. The solid moderator may be satisfactorily selected from graphite, beryllium (metal or oxide), and metal hydrides. Graphite technology is well advanced, but the core size required is greater than with the others. Beryllium oxide is atractive because the material might be used unclad in a steam atmosphere. However, BeO technology is not as far advanced, and the cost would be greater than for the other solid materials. The hydride is preferred because the greater moderating density of hydrogen leads to a smaller core size. The metal hydride also permits spatial variation of the hydrogen density in the moderator. In this way considerable flux flattening in both radial and axial directions can be achieved by adjusting the hydrogen density, usually in decreasing radial and axial concentrations. It should be understod that "hydride" is intended to embrace both the light hydrogen isotope of mass 1 and the heavier isotope deuterium of mass 2. With the deuteride, due to its lower neutron absorption cross section, fuel enrichment requirements are lessened, and natural uranium may be used in at least certain portions of the core.

Figure 10:
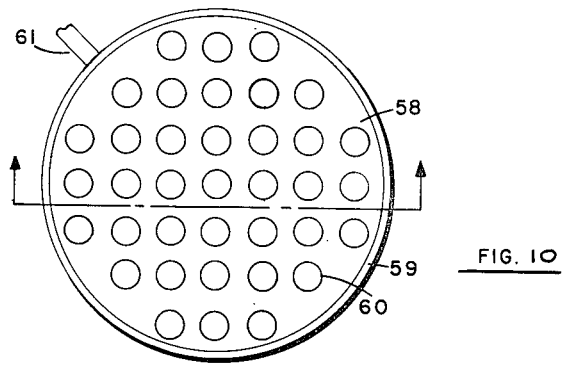
FIG. 10 is a plan of an alternate embodiment of the nuclear superheater region.
Figure 11:
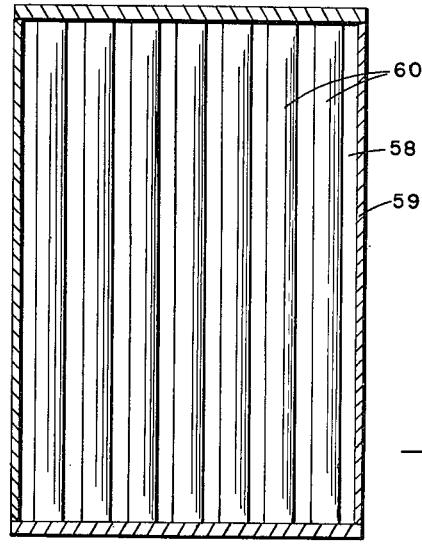
FIG. 11 is a section through FIG. 10.

The metal hydride may be chosen from any of the metal hydrides heretofore considered or used for nuclear reactor application, and no one metal or metal alloy hydride is critical. The metal portion of the hydride is preferably of relatively low thermal neutron absorption cross section, and forms hydrides which are relatively stable at elevated temperatures. Among the hydrides which may be used are lithium, calcium, yttrium, niobium, vanadium, tantalum, titanium, and zirconium hydrides. Zirconium hydride is the best understood and most commonly employed of the hydride systems, and its use in our invention is acordingly preferred. Zirconium hydride has oxidation properties litle different from zirconium itself. Massive zirconium hydride has better thermal conductivity than zirconium, and higher hydrogen density than saturated water at 600° F. Small core size heretofore associated only with water moderated reactors is therefore possible. $ZrH_2$ also has twice the ultimate strength of zirconium, although it is brittle. While massive zirconium hydride has better structural and heat transfer characteristics than powdered $ZrH^2$, the powdered material is considerably cheaper, and for certain applications, such as described below with reference to FIGS. 10 and 11, is preferred. To protect zirconium hydride against oxidation and loss of hydrogen at elevated temperatures, it should be clad or kept in a reducing atmosphere. A large number of metals and metal alloys and ceramic-metal compositions are available for cladding zirconium hydride and the use of one particular composition is not essential. For high temperature application (greater than 1600° F.) molybdenum, titanium, inconel and other nickel-chromium alloys of satisfactory oxidation resistance may be employed. For temperatures in the range of 1000° to 1200° F., the general range of interest in our invention, zirconium alloys, and the austenitic or ferritic stainlesss steels, particularly the 300 series such as types 304 and 347, can very satisfactorily be used as direct protective cladding. When desired, because of temperature considerations in the moderator, a metallurgical bond may also be applied between the moderator and the protective cladding. Methods generally known to the art may be employed; four possible fabrication methods are suggested. These methods are in situ hydriding of a canned zirconium shape; coextrusion of the hydride with cladding; contact alloy brazing where a braze is applied to the hydride before canning in the heat treatment; and isostatic pressure bonding of the cladding to the hydride.

Referring now to FIG. 1, our reactor has an active core 1 in the shape of a right circular cylinder, with a central superheater 2, an annular boiler 3, and a surrounding reflector 4. While the superheater is shown as located in the center of the two regions, it may also be located on the edge of the core. Locating the superheater at the edge, where the neutron flux is lowest, results in good neutron economy. However, center location has a number of advantages which led to the presently described embodiment of our invention. Center location tends to flatten radial flux, and hence reduce the overall peak-to-average power ratio, achieving higher average burnup. Insulation of the superheater is easily accomplished with only one side of small area to be insulated. Recirculation of boiler water is achieved without piping passing through the superheater region. Finally, the flow area required for the superheater is comparatively smaller.

Water 5 is used as the moderator in the boiling region and as the reflector. Zirconium hydride is the moderator in the superheater. Steam generated in the boiler passes above to a steam dome 6, and as indicated by the flow arrows, through steam scrubbers 7 into the central superheater in a single downward path, then into a steam plenum 8, and leaves the core through steam outlet lines 9. Boiling water is circulated upwardly through the core by four pumps in external loops; the water is introduced through inlet line 10 and removed through outlet line 11 after passing through entrainment separators 12. Of the total reactor power, approximately 25% is developed in the superheater and the remainder in the boiler region. The core tank (pressure vessel) 13 is constructed of carbon steel clad with stainless steel, with the exception of the outlet end of the superheater nozzle 14 which is stainless steel. The inner wall of the core tank also has a stainless steel cladding. Two thermal shields 15 and 16, 1 in. and 2 in. thick, extend approximately 1 in. above and below active core 1, and separate the core tank from the core. Another thermal shield 17 is positioned near the core tank head 18 and separates it and superheater region 2. In the present design, the core vessel has an outside diameter of 10 ft., an overall height of 35 ft., and a wall thickness of 5 in. The entire pressure vessel shell is essentially at the temperature of the boiling water.

The superheater 2 is separated from boiler 3 by an insulator region 19. The steam plenum 8 and steam outlet 9 line have an insulating jacket 20 which contains saturated steam bled into it from the boiler. The jacket 20 around the steam line has a bellows 21 for thermal expansion purposes. The insulation prevents heat loss of superheated steam to the boiler region, and particularly from the steam plenum to cold inlet water.

The fuel elements 22 of the boiler seat on a two section lower grid plate 23 which aligns the element and carries the majority of the weight of the core. The superheater fuel elements sit on a single bottom grid plate 24 which forms the top of steam plenum 8. The upper grid plate 25 in the boiler region holds the fuel elements down against the frictional load of upward flowing water with connecting rod 26 and spring 27. The control rods 28 are bottom driven, enter the core tank through the bottom cover 29, and are guided past lower grid plate 23 in guide tubes 30 positioned in the plenum 31 below the active core region between bottom core tank cover 29 and grid plate 23.

The steam separation or moisture removal from the saturated steam is accomplished by conventional steam scrubbing devices 7 located in the core tank 13 and vessel head 18 or in steam separators located outside the pressure vessel. With a water purity of 1.0 p.p.m. (max.) in the boiler and a water carryover through the scrubbers of 0.5%, the saturated steam entering the superheater would have a solids content of only 0.005 p.p.m.

Figure 2:
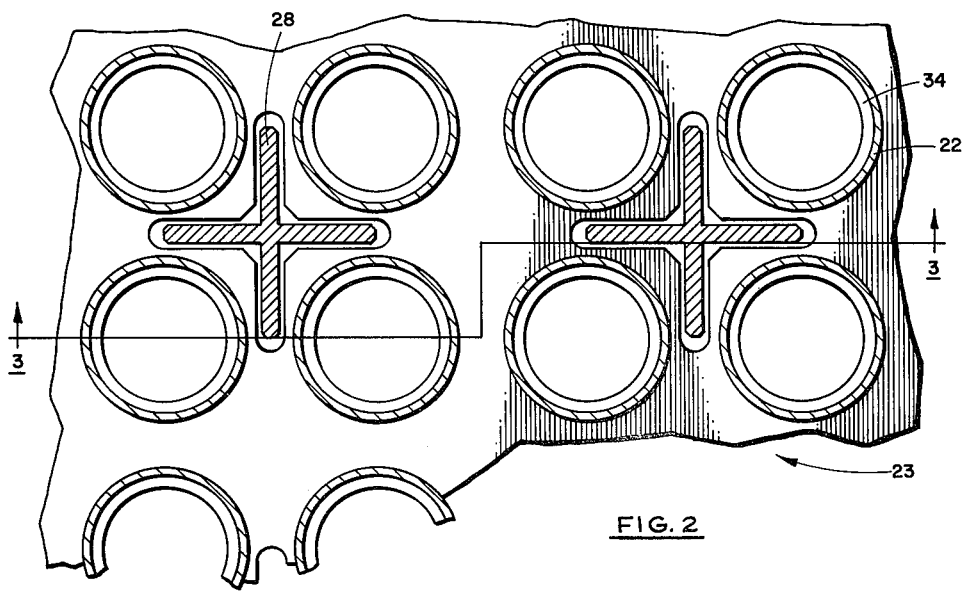
FIG. 2 is an enlarged section of the lower grid plate taken along line 2—2 of FIG. 1.
Figure 3:
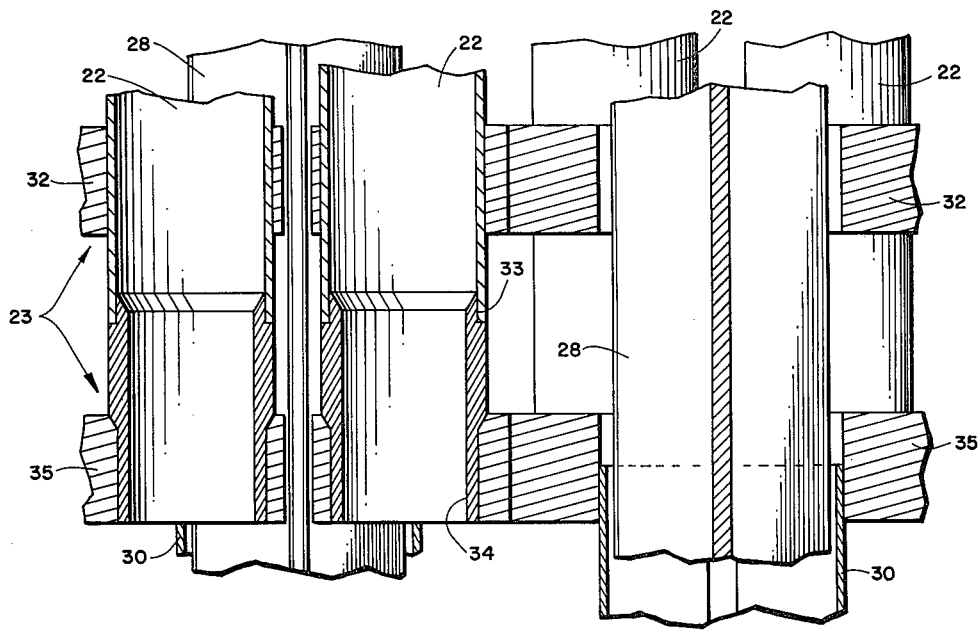
FIG. 3 is a section along line 3—3 of FIG. 2, partly in elevation.

The details of the boiler fuel element and control rod guide tube seating in the two-section lower grid plate 23 are seen in FIGS. 2 and 3. The fuel element 22 passes through the upper section 32 of the lower grid plate. The frame of the fuel element 33, which supports the active fuel region, is welded to a tapered hollow nozzle 34 which sits in the lower section 35 of the bottom grid plate. The control rod guide tube 30 extends into the lower bottom grid plate 35 where it is free to slide in thermal expansion or contraction. The guide tubes do not extend into the active core region; in the active core region the control rods are guided by the fuel elements, as will be shown below.

The core tank 13, thermal shields 15 and 16, water inlet lines 10, and steam outlet lines 9, and the integral boiler 3 and superheater 2 core, may be seen clearly in FIG. 4.

Figures 5, 6:
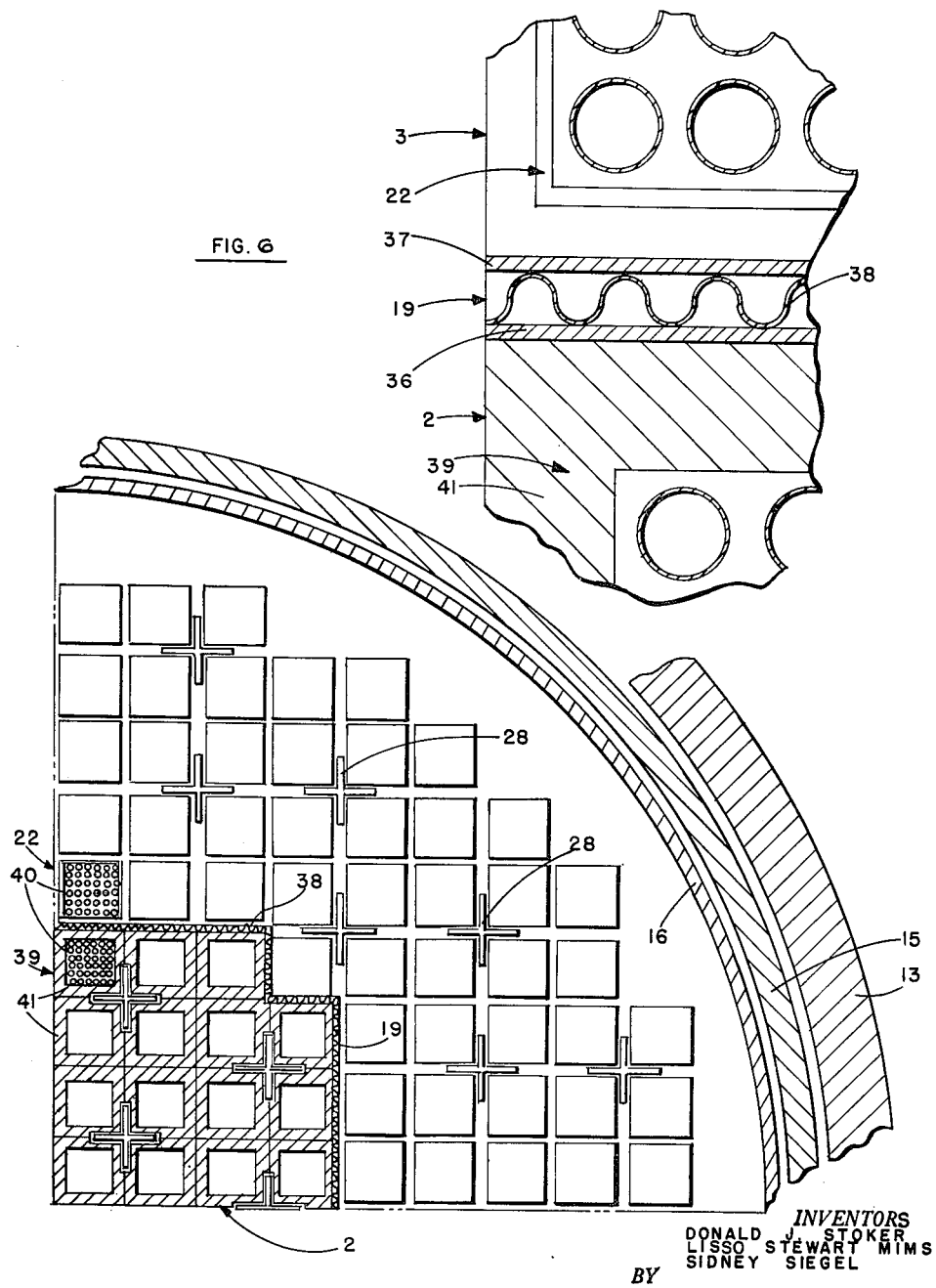
FIG. 5 is an enlarged sectional quadrant along line 5—5 of FIG. 4 showing the reactor core arrangement.
FIG. 6 is an enlarged detail of FIG. 5.

Turning now to FIG. 5, which is an enlarged quadrant of the core shown in FIG. 4, we see that the core lattice has about 256 spaces with 60 of the spaces occupied by superheater 2. The lattice spacing is 5 in. The insulator region 19 between the boiler and superheater regions is seen clearly in the enlarged fragment FIG. 6. The wall 36 of the superheater and the wall 37 of the boiler are separated by corrugated stainless steel 38. The corrugation lends additional strength to the thin boiler and superheater walls, and takes up any pressure differential resulting from pressure drops in the water and steam flow circuits. Saturated steam entering the superheater from the boiler provides a stagnant insulation layer between the superheater and the boiler. In the particular design example illustrated, the superheater fuel element 39 and the boiler fuel element are square. The fuel elements for both the boiler region and the superheater region are comprised basically of a plurality of parallel, cylindrical pins 40. The basic difference between the two types of fuel elements is the solid moderator 41 surrounding the fuel pins in the superheater fuel element. Obviously, however, the pin-type element is not critical, and other fuel element configurations, such as the well known plate or MTR-type elements, or hollow cylindrical elements, can be equally satisfactorily employed. Similarly, there is wide choice in the cladding and structural material and the form of the fissile material. Further details regarding the fuel element are given below.

The control rods 28 are in cruciform shape, and the particular reactor design illustrated has 42 control rods which regulate power and provide shutdown. Fourteen of the rods are in the superheater and 28 in the boiler. As seen in FIG. 1, the rod drives extend from the bottom of the core tank into a subpile room. The drive mechanism may be suitably chosen from among the large number now available. One satisfactory drive system uses a hydraulic null balance which holds a piston assembly against a mechanical stop, a simple screw device which operates near zero loads. The piston assembly causes a scram if either the reactor pressure or the operating accumulator pressure fails.

Figure 7:
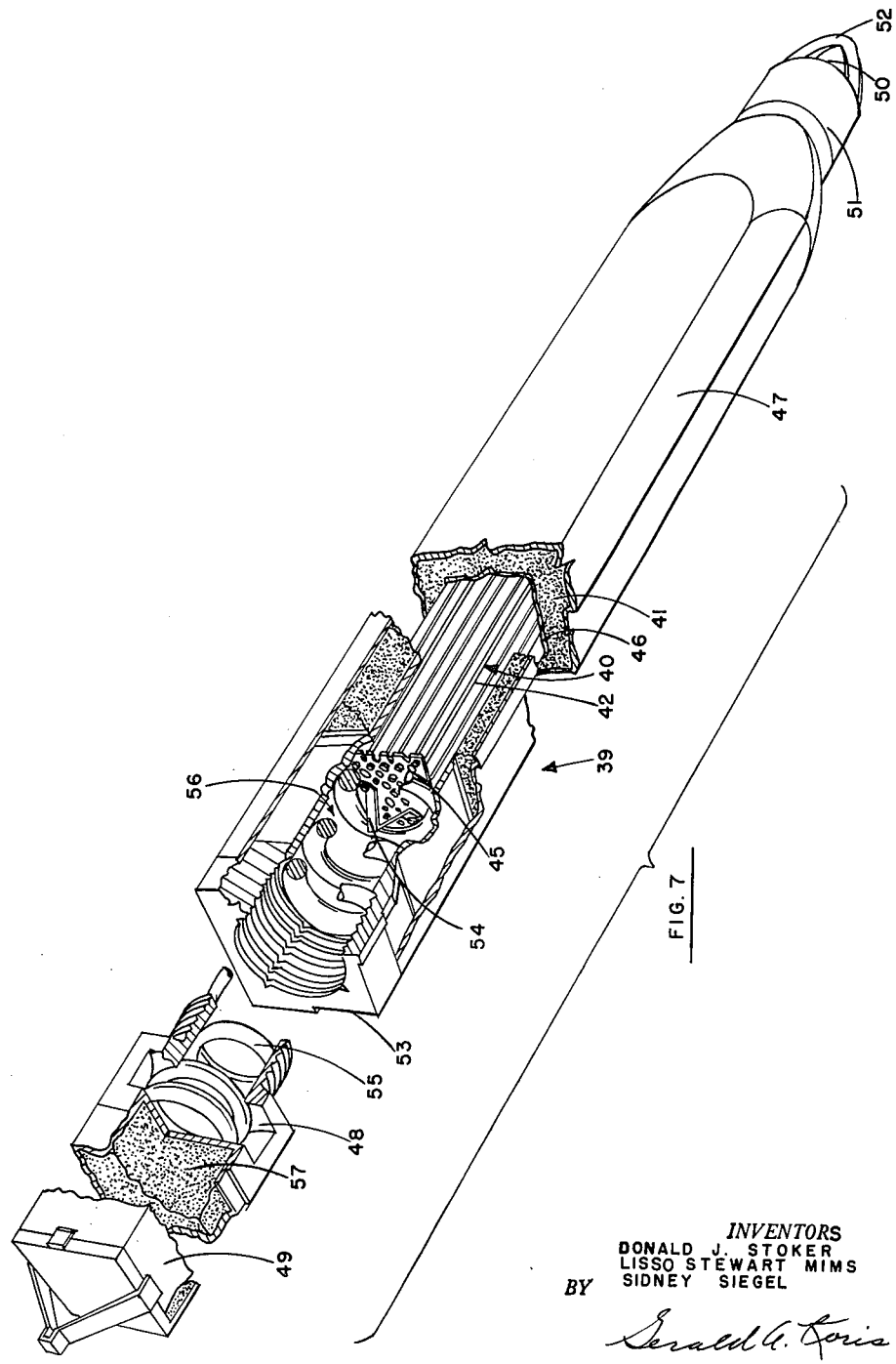
FIG. 7 is a perspective view of a fuel element, partly cut away.

Turning now to FIGS. 7 and 8 for an examination of the superheater fuel element, the fuel is slightly enriched (about 2%) uranium dioxide fabricated as a small sintered, solid, pellet (0.5 in. long, 0.455 in. O.D.). However, the fuel form is not critical. Any form of fissile material, such as uranium or plutonium metals, alloys (e.g. uranium-thorium, uranium-molybdenum, uranium-zirconium, uranium-aluminum, etc.), and ceramics (e.g. carbides, nitrides, etc.), may be used. Similarly, the cladding and structural material may satisfactorily vary among water-corrosion-resistant materials of relatively low thermal neutron absorption cross section. Satisfactory examples are aluminum alloys such as aluminum-aluminum oxide, zirconium and its alloys, nickel, titanium, niobium, and nickel-chromium alloys such as Inconel.

A plurality of fuel pellets are encased in a 0.020 in. wall stainless steel jacket 42. As seen in FIG. 8, each resulting fuel cylinder has a screw portion 43, is threaded to receive another such fuel cylinder, and the fuel cylinders are then connected together through a spider grid 44 to form an overall fuel pin 40. The superheater fuel cell consists of 36 such 10-ft. pins in a 3.5 in. square fuel channel. The pins are connected at their ends to a fuel support plate 45. A 0.6 in. block of zirconium hydride 41 clad with 0.010 in. thick stainless steel 46 surrounds the 36 fuel pins as a picture frame and actually forms the flow channel. The exterior frame 47 of the fuel element is similarly of stainless steel in this embodiment, but any of the above metals may also be used. By orificing at the bottom grid plate a small amount of steam is bypassed between the individual superheater fuel cells to insure adequate cooling of the moderator. The superheater fuel cells shown permit removal of the moderator from the core if desired.

Saturated steam enters the superheater fuel element through an inlet duct 48 in the head fixture 49 above the active region and leaves through an orifice 50 in the tapered, hollow end fixture 51 which has a guide 52 to help in fuel loading. The average steam flow rate is 100 f.p.s. and the maximum cladding temperature is approximately 1300° F. in the hottest channel.

The exterior of the fuel element is notched along its length at 53 for control rod passage, and the fuel element thus guides the control rod in the core. A lifting bracket 54 is connected to fuel support plate 45 and a spring 55 is positioned between fuel support plate 45 and head fixture 49 to take up any fuel plate expansion. A gas space 56 above the zirconium hydride moderator is provided for expansion of any hydrogen (decomposed from the moderator) or other gases. The gas space may be filled with hydrogen or an inert gas. Additional zirconium hydride 57 or other moderator material is positioned in the head fixture to serve an axial reflector function.

Figure 9:
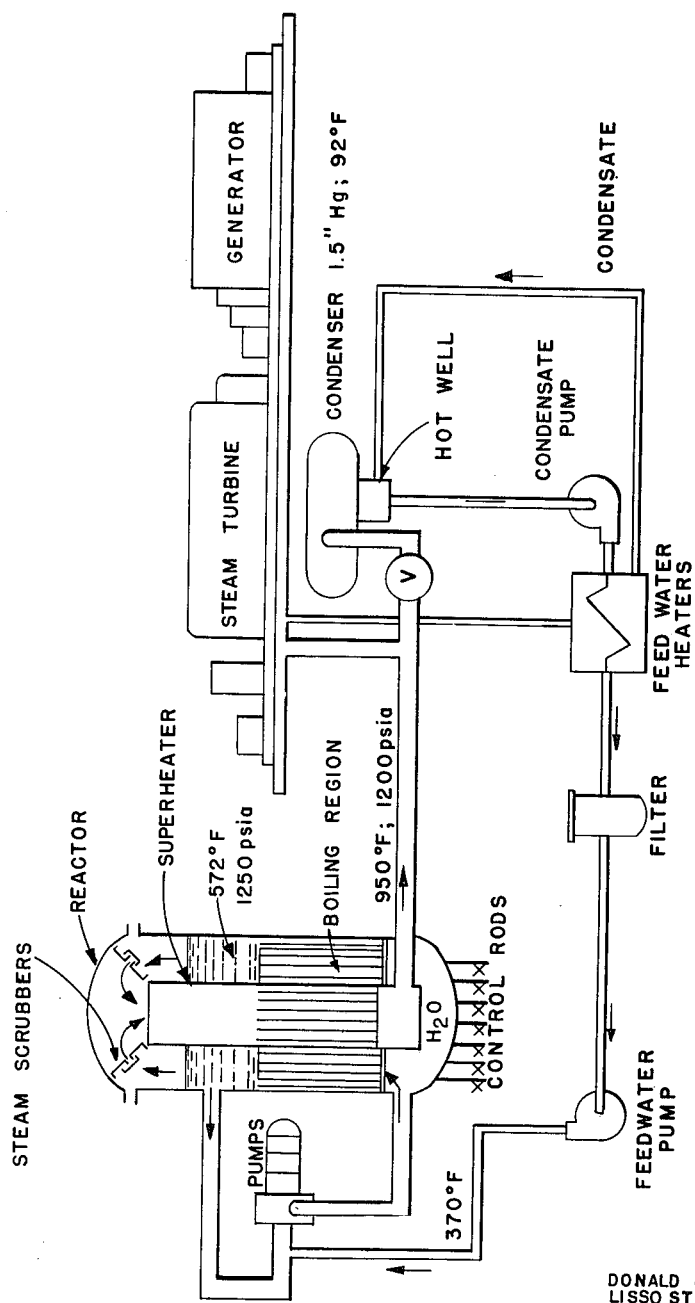
FIG. 9 is a schematic flow diagram of the reactor process system.

The process flow diagram of our reactor system is shown in FIG. 9, which is self-explanatory with the legends applied thereon. It is noted that a direct cycle boiling water reactor is shown, wherein all the heat is removed by boiling followed by superheating, with the superheated steam going directly to the turbine without use of an intermediate heat exchanger. However, the dual cycle boiling water approach may also be suitably taken with our invention, wherein in addition to boiling, a portion of heated boiler water is passed to a heat exchanger.

The following table gives further details of the reactor described above.

*Table*

(1) Reactor:

| | |
|---|---|
| Nominal thermal power | 420 mw. |
| Inlet water temperature | 555° F. |
| Recirculation rate—boiler | 12.5:1. |
| Saturated steam temperature— 1250 p.s.i.a. | 572° F. |
| Steam outlet temperature | 950° F. |
| Total steam flow rate at nominal power | $1.7 \times 10^6$ lb./hr. |
| Active core height | 10 ft. |
| Active core diameter | 9 ft. |
| Number of boiler elements | 196. |
| Number of superheater elements | 60. |
| Number of ½ in. rods per element | 36. |
| Critical loading | 500 kg. U–235. |
| $UO_2$ loading at nominal power | 33,800 kg. |
| Fuel enrichment-normal operation | 2 a/o U–235. |
| Number of control-safety rods | 42. |
| Mixed mean outlet velocity-average boiler element | 13 ft./sec. |
| Outlet velocity-average superheater element | 110 ft./sec. |
| Weight of zirconium hydride in core | 1600 lb. |

(2) Steam and turbine-generator:

| | |
|---|---|
| Nominal net electrical output | 150 mw. |
| Gross electrical output | 165 mw. |
| Steam pressure at turbine | 1200 p.s.i.a. |
| Steam temperature at turbine | 950° F. |
| Feedwater temperature to reactor | 375° F. |

An alternate superheater region is shown in FIG. 10 and 11 using powdered $ZrH_2$. The $ZrH_2$ powder 58 is packed in a container vessel 59 through which process tubes 60 pass, resulting in a calandria-type core. This differs from the embodiment described above wherein massive $ZrH_2$ is part of the fuel cell itself. In the present embodiment, fuel elements (not shown) are positioned in the process channels defined by process tubes 60. Hydrogen gas pressure is applied through a line 61 to zirconium hydride powder 58 to balance the pressure of the superheated steam through the process tubes. This allows thin-walled process tubes to be used, and maintains the hydrogen concentration of the hydride.

The above-described specific embodiments are only illustrative rather than restrictive of our invention. It should be appreciated that other design modifications may be made which are within the spirit of our invention.

We claim:

A nuclear reactor superheat fuel-moderator element comprising in combination a tubular frame having an interior and exterior wall, said interior wall forming a coolant flow channel, coolant inlet and outlet means at opposite ends of said channel, said walls forming a closed container, a solid moderator in said container, means for supporting fissionable material within said channel in spaced relation with and surrounded by said closed container, said means including a plurality of tubes, each of said tubes containing a portion of said fissionable material, a perforated plate interconnecting respective ends of said tubes for maintaining said tubes in spaced relation, said perforations connecting said coolant flow channel with the space between said tubes, and means cooperating with said plates for resiliently supporting said fuel-containing tubes in said channel.

References Cited by the Examiner

UNITED STATES PATENTS 3,009,869 11/1961 Bassett _____ 176—76
3,111,475 11/1963 Davidson _____ 176—71

OTHER REFERENCES

Starr: Proceedings of the International Conference on the Peaceful Uses of Atomic Energy, vol. 3, 1955, pp. 102–109.

REUBEN EPSTEIN, *Primary Examiner.*

CARL D. QUARFORTH, *Examiner.*